Patented Mar. 25, 1952

2,590,818

UNITED STATES PATENT OFFICE 2,590,818

PARASITICIDE COMPOSITION

Oscar H. Hammer, South Haven, Mich., assignor to The Dow Chemical Company, Midland, Mich., a corporation of Delaware No Drawing. Application August 15, 1949, Serial No. 110,480

3 Claims. (Cl. 167—28)

This invention relates to parasiticide compositions and is particularly directed to compositions including 4'-chlorophenyl 4-chlorobenzene sulfonate and an oil.

The oil emulsions now largely employed for horticultural sprays contain highly refined petroleum fractions or distillates which are commonly called white oils. Although such highly refined oils have been found less injurious to plant foliage than other oils, they have also been found less toxic to plant parasites. Thus, at the concentrations necessary for effective insect control, white oil emulsions often produce physiological disturbances due to the translocation of oily residues and due to a reduction in normal transpiration. More volatile oils at high dilutions have been found to evaporate so rapidly as to fail in accomplishing optimum insect control. In the case of dormant sprays, the high oil concentrations necessary for complete pest control frequently cause such bud and twig injury as seriously retards the development of the tree. Summer applications of common oil emulsions in effective concentrations have been found to cause reduction in size, faulty coloring, and premature dropping of fruit as well as serious defoliation of trees.

It has been discovered that 4'-chlorophenyl 4-chlorobenzene sulfonate may be combined with an oil to produce a composition having very desirable properties for the control of plant parasites. In such compositions, the oil and 4'-chlorophenyl 4-chlorobenzene sulfonate are mutually activating, so that a greater than additive or synergistic result is obtained, particularly as regards mite and spider mite control. The mixture of toxicants permits the use of reduced amounts of oil and 4'-chlorophenyl 4-chlorobenzene sulfonate and the achievement of results superior to those obtained when either of the constituents is used separately. At these lower oil concentrations, the injurious effects of the oil on growing plants are materially reduced. These lower effective concentrations of the oil in the toxicant mixture have also made feasible the application of emulsions of less highly refined and cheaper oils without introducing into their use increased hazards to the plant host. A further advantage resides in the prolonged residual effect exerted by the mixture. Thus a single application of the combination of oil and 4'-chlorophenyl 4-chlorobenzene sulfonate in aqueous dispersion, gives excellent control of *Paratetranychus pilosus* (European red mite), *Bryobia praetiosa* (clover mite) and *Anuraphis roseus* (rosy apple aphid) for periods ranging up to several months.

In the preferred method of operation, at least from about 1 to 40 parts by weight of oil is employed with each 1 part of 4'-chlorophenyl 4-chlorobenzene sulfonate. In such parasiticidal compositions, the toxicants are mutually activating and exert a synergistic effect. In aqueous emulsion spray compositions, the proportions of the toxicants and dosages applied should be so integrated that the content of 4'-chlorophenyl 4-chlorobenzene sulfonate is at least 0.1 pound and the content of the oil is at least 0.5 gallon per 100 gallons of spray. The exact amounts to be employed are dependent upon the organism to be controlled and upon whether the composition is to be employed as a dormant or summer spray. In concentrates, the oil and 4'-chlorophenyl 4-chlorobenzene sulfonate may constitute from 5 to 95 per cent by weight of the ultimate composition.

It is to be understood that in compositions comprising mixtures of these two toxicants, either component may be present in the composition in excess of the preferred proportions recited. Such a composition constitutes a combination of the synergistic mixture with additional parasiticidal toxicant, and this practice in no way detracts from the improved result obtainable with the preferred proportions of the oil and 4'-chlorophenyl 4-chlorobenzene sulfonate.

In operating in accordance with the present invention the oil and 4'-chlorophenyl 4-chlorobenzene sulfonate are dispersed in water to form aqueous emulsion spray compositions. Also, a mixture of the toxicants may be so compounded as to produce concentrates adapted subsequently to be dispersed in water to form emulsion spray compositions.

In practice, 4'-chlorophenyl 4-chlorobenzene sulfonate may be dispersed in the water together with an emulsifying agent. The oil may then be mixed with the latter dispersion to form an aqueous emulsion spray composition of suitable strength for application to trees and plants.

Alternatively, the toxicants may be mixed one with the other and the resulting composition mixed with the water in the presence of an emulsifying agent. A further mode of operation includes grinding 4'-chlorophenyl 4-chlorobenzene sulfonate with bentonite, fuller's earth or diatomaceous earth and dispersing the resulting mixture and the oil in water in the presence of an emulsifying agent.

Where a concentrate is desired, the 4'-chlorophenyl 4-chlorobenzene sulfonate and oil may be mixed with dispersing and emulsifying agents to produce products adapted to be mixed with water or oil in water emulsions to form emulsion spray compositions. Alternatively, 4'-chlorophenyl 4-chlorobenzene sulfonate may be separately compounded in concentrate form and mixed with the oil and water in the spray tank.

The oil to be employed in the compositions of the present invention is of petroleum origin having at least 50 per cent by weight of unsulphonated residue.

Dispersing and emulsifying agents adapted to be employed in the compositions as suggested above include casein, sodium caseinate, blood albumin, alkylated aryl polyether alcohol (Triton X-100), phthalic glycerol alkyl resin (Triton B-1956), dioctyl sodium sulfosuccinate (Aerosol OT), polyethylene sorbitol oleate-laurate (Atlox 1045-A), and polymethylene sorbitan trioleate (Tween 85). Other conventional additaments may be employed provided that such agent accomplish the end desired and not be reactive with the other ingredients of the composition so as to reduce their effectiveness.

4'-chlorophenyl 4-chlorobenzene sulfonate is a white crystalline solid melting at 81° to 38° C., and having the following formula:

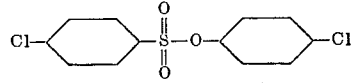

The following examples illustrate the invention but are not to be construed as limiting:

*Example 1*

A parasiticide concentrate composition in the form of a wettable powder was prepared by grinding and mixing 40 parts by weight of 4'-chlorophenyl 4-chlorobenzene sulfonate, 56.5 parts of fuller's earth, 2 parts of a substituted benzoic alkyl sulfonic acid (Daxad No. 27), and 1.5 of an alkyl aryl sulfonate (Nacconol NR). This composition will hereinafter be known as "Composition A." In a further operation, 98.9 parts by weight of a semi-refined petroleum oil having an unsulfonated residue of about 79.5 per cent, a Saybolt viscosity of about 105 seconds at 100° F., and a boiling range of about 611°–756° F., and Triton B-1956 were mixed together to prepare a concentrate composition hereinafter known as "Composition B."

The foregoing compositions both alone and in combination were applied in aqueous dispersion as dormant spray compositions to apple trees of Chenango variety heavily infested with European red mite eggs. The sprays were applied with conventional spray rigs and in such quantity as to provide run-off from all trunk and branch surfaces. Unsprayed check plots were scattered through the orchard to provide a continuous source of reinfestation. 89 days after the application, the foliage of the trees of the sprayed and check plots was subjected to randomized sampling, and the individual leaves examined to determine the existent mite populations. The following table sets forth the amounts of materials employed and the mite counts obtained in the samplings of the leaves of the treated and check trees:

| Amount of composition per 100 gallons of spray | | Average number of mites per 50 leaves 89 days following the application of the sprays |
|---|---|---|
| Composition A | Composition B | |
| Pounds 2.5 | Gallons | 81 |
| | 3 | 175 |
| 2.5 | 1 | 3 |
| (Check) | | 1,953 |

The foliage of the trees sprayed with the combination of toxicants remained green and lush throughout the growing season. The check trees suffered partial defoliation with yellowing and bronzing of the remaining foliage due to high mite population. No injury to leaves resulted from the spray treatments.

*Example 2*

In a similar fashion, compositions A and B were applied in aqueous dispersion as dormant sprays for the control of European red mite on apple trees. The applications were made on March 24 and 25, and in such amount as to provide for run-off from all tree surfaces. The following table sets forth the results obtained:

| Amount of composition per 100 gallons of spray | | Average number of mites per 50 leaves 4 months following the application of the sprays |
|---|---|---|
| Composition A | Composition B | |
| Pounds 5 | Gallons | 113 |
| | 2 | 100 |
| 2.5 | 2 | 62 |
| (Check) | | 3,016 |

Incidental to the control of European red mite, a 100 per cent control of rosy aphids was obtained on the trees treated with the combination of toxicants.

*Example 3*

In the previously described manner, compositions A and B both alone and in combination one with the other were applied in aqueous dispersion as dormant sprays for the control of European red mite in an orchard of plum trees. The various spray compositions were applied on March 28. Unsprayed check trees were scattered through the orchard to provide a continuous source of reinfestation. Three months following the application of the sprays, the leaves of the trees were examined and the average mite populations determined. The results obtained are set forth in the following table:

| Amount of composition per 100 gallons of spray | | Average number of mites per 50 leaves 3 months after the spray application |
|---|---|---|
| Composition A | Composition B | |
| Pounds 5 | Gallons | 138 |
| | 3 | 96 |
| 2.5 | ½ | 27 |
| (Check) | | 2,480 |

*Example 4*

Compositions A and B as described in Example 1 were employed in dormant spray applications for the control of rosy aphids in an orchard of Chenango apple trees. The materials were applied in aqueous dispersion and in such amount as to accomplish run-off of spray from the tree surfaces. Check plots were maintained throughout the orchard to provide a continuous source of reinfestation. The various spray applications were made on April 2. The amounts of materials employed and the average rosy aphid populations existent 3 months after the application of the spray compositions are set forth in the following table:

| Amounts of composition per 100 gallons of spray | | Average number of Rosy Aphids per 50 leaves 3 months following the spray application |
|---|---|---|
| Composition A | Composition B | |
| Pounds | Gallons | |
| 2.5 | | 26 |
| | 3 | 155 |
| 2.5 | 1 | 0 |

The foliage of the trees in the check plots exhibited severe aphid injury during the observation period. No foliage injury attributable either to the aphids or to the toxicant mixture was observed on the trees sprayed with the combination of compositions A and B in aqueous dispersion. Incidental to the control of rosy aphids, a commercial control of European red mite was accomplished by the mixture of toxicants.

I claim:

1. A miticide composition comprising as active toxic ingredients at least from about 1 to 40 parts by weight of an oil of petroleum origin having an unsulphonated residue of at least 50 per cent for each 1 part of 4'-chlorophenyl 4-chlorobenzene sulfonate, the active toxic ingredients of such composition being mutually activating.

2. An aqueous miticide emulsion comprising as active toxic ingredients at least from about 1 to 40 parts by weight of an oil of petroleum origin having an unsulphonated residue of at least 50 per cent for each 1 part of 4'-chlorophenyl 4-chlorobenzene sulfonate, the active toxic ingredients of such composition being mutually activating.

3. A composition as defined in claim 2, wherein the 4'-chlorophenyl 4-chlorobenzene sulphonate is present in the amount of at least 0.1 pound and the oil in the amount of at least 0.5 gallon per 100 gallons of spray.

OSCAR H. HAMMER.

REFERENCES CITED

The following references are of record in the file of this patent:

UNITED STATES PATENTS

| Number | Name | Date |
|---|---|---|
| 2,538,727 | Kenaga | Jan. 16, 1951 |
| 2,538,728 | Kenaga | Jan. 16, 1951 |
| 2,538,729 | Kenaga | Jan. 16, 1951 |

OTHER REFERENCES

Penny: J. Econ. Ent., vol. 25, October 1932, pages 1002–1007.

Pearce et al.: J. Econ. Ent. vol. 35, No. 2, pages 211–219.

Chapman et al.: J. Econ. Ent., vol. 36, No. 2, April 1943, pages 241–247.

Lauger et al.: Pamphlet entitled "The Constitution and Toxic Effect of Botanicals and New Synthetic Insecticides," translated from Helvetica Chimica Acta, vol. XXVII, Fasciculus Quartus (1944), by the Geigy Co. (1945) pages 1–42.

Metcalf: J. Econ. Ent., vol. 41, No. 6, December 1948, pages 875–882.

De Ong: "Chemistry and Uses of Insecticides," Reinhold Publishing Corp., New York, 1948, pages 137–140.